Jan. 12, 1937.  L. FONTAINE, JR  2,067,697
SAFETY DEVICE FOR HYDRAULIC BRAKES
Filed June 25, 1936
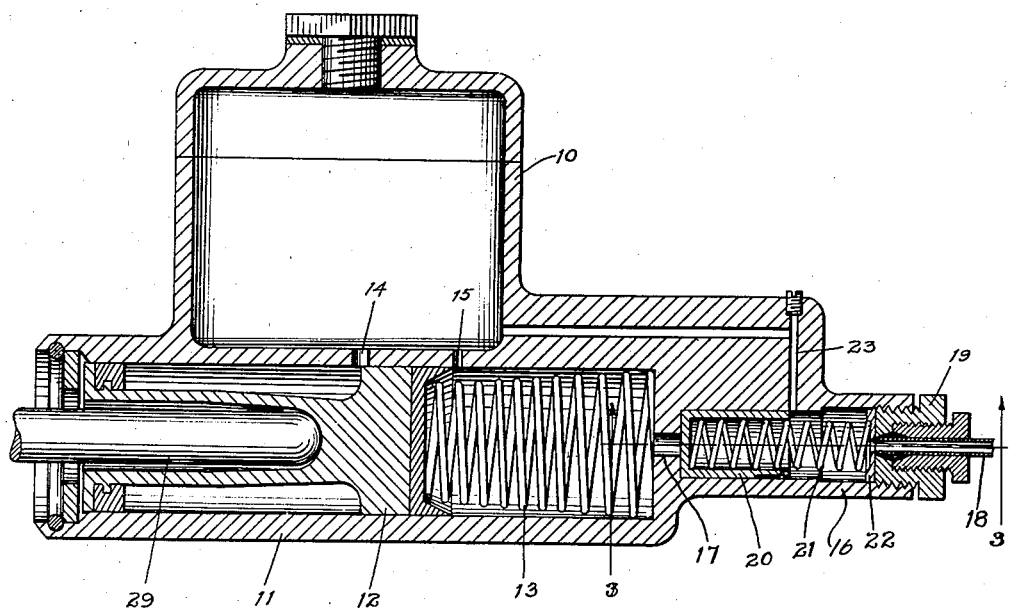
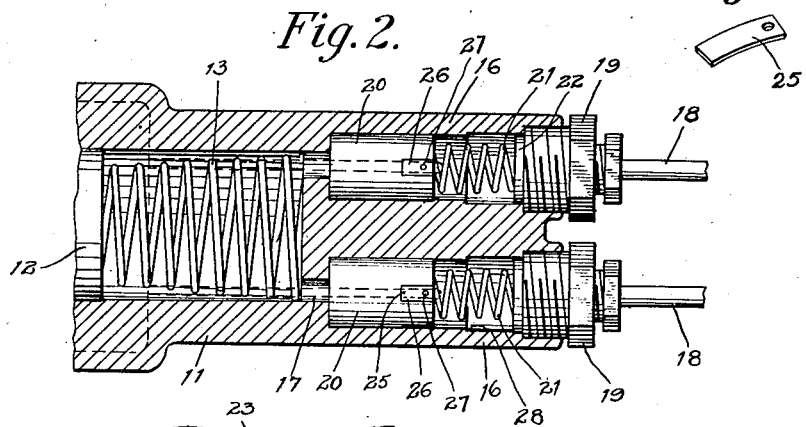
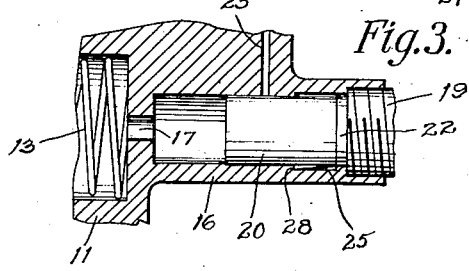
Lamar Fontaine Jr.
INVENTOR
BY *Victor J. Evans & Co.*
ATTORNEYS Patented Jan. 12, 1937

2,067,697

UNITED STATES PATENT OFFICE 2,067,697

SAFETY DEVICE FOR HYDRAULIC BRAKES

Lamar Fontaine, Jr., Baton Rouge, La., assignor of three-eighths to Kathryn Martin Fontaine, and one-fourth to L. J. Voorhies, Sr., both of East Baton Rouge Parish, La.

Application June 25, 1936, Serial No. 87,313

1 Claim. (Cl. 60—54.5)

This invention relates to safety devices for hydraulic brakes and has for an object to provide auxiliary cylinders between the master cylinder and the wheel cylinders, the auxiliary cylinders having pistons therein respectively adapted to close when pressure is lost in any of the lines to the wheel cylinders and seal the remainder of the system pressure tight, with the exception of the brake having the leak therein, thus permitting the remaining brakes to operate properly.

A further object is to provide novel means assembled with the auxiliary cylinder pistons for locking the pistons against returning to normal position after having once operated when a leak occurs.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a longitudinal sectional view through a safety device for hydraulic brakes constructed in accordance with the invention.

Figure 2 is a longitudinal sectional view of the device taken in a plane at a right angle to Figure 1.

Figure 3 is a detail sectional view taken on the line 3—3 of Figure 1 and showing one of the auxiliary cylinder pistons locked against returning to normal position.

Figure 4 is a perspective view of the locking leaf spring.

Referring now to the drawing in which like characters of reference designate similar parts in the various views, 10 designates a master cylinder reservoir of a conventional hydraulic brake system, 11 designates the master cylinder, 12 the master piston, and 13 the helical spring in the master cylinder for returning the piston to neutral position after each operation. Ports 14 and 15 connect the reservoir with the master cylinder on opposite sides of the master piston when the latter is in neutral position to maintain the cylinder filled with oil which merely forms the fluid pressure medium. These parts are conventional and the safety devices comprising the subject matter of this invention are assembled with these parts as will now be described.

Preferably two or four auxiliary cylinders 16 are formed integral with the master cylinder, two auxiliary cylinders being shown in the present embodiment. Each auxiliary cylinder communicates at one end with the master cylinder through a passage 17 and at the opposite end with a pipe 18 which leads to a corresponding wheel cylinder of the vehicle. The pipe is assembled with the auxiliary cylinder by means of a nut 19 or other suitable connector. A hollow auxiliary piston 20 is slidably fitted in the auxiliary cylinder and houses a helical spring 21, one end of which bears against the piston and the opposite end of which is seated in a washer 22. The spring tends to constantly hold the piston in neutral position at the inner end of the cylinder, as shown in Figures 1 and 2. A passage 23 is formed in the master and auxiliary cylinder assembly and connects the master cylinder reservoir 10 to the auxiliary cylinders 16 in advance of the piston 20 when the latter is in neutral position so that the pipe line 18 may be maintained filled with the pressure fluid medium.

A leaf spring 25 is fitted in a longitudinal recess 26 formed in the outer surface of the auxiliary piston at the front end thereof and is anchored in place by a screw 27. The leaf spring is held seated in the recess by the wall of the auxiliary cylinder but when the piston is moved forward due to loss of pressure in the pipe 18, the spring is free to move away from the cylinder at the free end and form a dog to engage against a shoulder 28 formed at the front end of the cylinder by slidably increasing the inner diameter of the cylinder, and lock the piston against retrograde movement.

In operation pressure on the master piston rod 29, which is ordinarily connected to the foot pedal forces the master piston forward in the master cylinder 11, to close the port 15 and force the fluid pressure medium out of the master cylinder through the passage 17 into the auxiliary cylinder 16. Pressure acting against the auxiliary piston 20 forces the auxiliary piston forward to seal the passage 23 and force the fluid pressure medium ahead of it through the pipe 18 to the corresponding wheel cylinder to set the associated brake.

In the event of a leakage in any of the pipe lines 18 or wheel cylinders, the corresponding auxiliary piston will be forced forward by pressure behind it and loss of pressure in front of it and seal the passage 23, finally coming to rest in operative position against the washer 22, fixed on the pipe line 18 to suitably connect it to the nut 19, as shown in Figure 3. Thereupon the leaf spring 25 springs outwardly and lodges against the shoulder 28 to prevent retrograde movement of the piston.

As long as there is pressure in the pipe 18 to the wheel cylinders the auxiliary pistons 20 can move past the passage 23 but not to the washer 22. It moves to about one-half inch from the washer 22 in normal operation. As soon as the pressure in front of the pistons is released by leakage in any pipe 18, the corresponding auxiliary piston will immediately be forced against the washer and be locked against retrograde movement. After the brake has been repaired the locked auxiliary piston may be restored to normal working order by removing the nut 19 and inserting a cylindrical shim in the enlarged end of the cylinder to press the spring back into its recess whereupon the piston may be returned to neutral position by sliding it rearward. When the nut 19 is removed the spring 21 is under no pressure.

In a system of four auxiliary cylinders there will be an auxiliary cylinder for each wheel cylinder, while a system of two auxiliary cylinders will permit of one cylinder being connected to the wheel cylinders of both front wheels, and the other auxiliary cylinder being connected to the wheel cylinders of both rear wheels. In a system of four cylinders, should leakage occur in any one pipe line, there would still be three remaining brakes functioning properly, while in a system of two auxiliary cylinders should a leakage occur in the pipe line of one of these cylinders, there would be two wheel brakes functioning properly. Three brakes functioning would apply more braking surface and stop the vehicle more quickly, but the vehicle would have a tendency to skid, while if only the front or the rear wheels were braking the car, the vehicle would have no tendency to skid.

From the above description it is thought that the construction and operation of the invention will be fully understood without further explanation.

What is claimed is:

In a hydraulic brake for motor vehicles, a reservoir for a fluid pressure medium, a master cylinder connected with the reservoir, a spring pressed piston in the master cylinder, a plurality of auxiliary cylinders connected with the master cylinder and connected with the reservoir, brake pipes connected with the auxiliary cylinders for conducting the fluid pressure medium to the wheel cylinders of the motor vehicle, spring pressed pistons in the auxiliary cylinders adapted to seal the brake pipes and disconnect the reservoir from the auxiliary cylinders upon loss of pressure in the brake pipes, each auxiliary cylinder having a shoulder in the path of movement of its associated piston, and a spring dog on said associated piston adapted to engage said shoulder and lock the piston stationary in position to seal the brake pipe and cut off the reservoir from the auxiliary cylinder.

LAMAR FONTAINE, Jr.